US 6,539,576 B2

(12) United States Patent
Kim

(10) Patent No.: US 6,539,576 B2
(45) Date of Patent: Apr. 1, 2003

(54) ADAPTER FOR WINDSHIELD WIPER ARMS

(75) Inventor: In-Kyu Kim, Kyonggi-do (KR)

(73) Assignee: ADM 21 Co., Ltd., Ansan-Shi (KR)

( * ) Notice: Subject to any disclaimer, the term of this patent is extended or adjusted under 35 U.S.C. 154(b) by 0 days.

(21) Appl. No.: 09/861,653

(22) Filed: May 22, 2001

(65) Prior Publication Data

US 2002/0174505 A1 Nov. 28, 2002

(51) Int. Cl.$^7$ ................................................ B60S 1/40
(52) U.S. Cl. ..................................................... 15/250.32
(58) Field of Search ........................ 15/250.32, 250.31, 15/250.43, 250.44, 250.361; D12/219, 220

(56) References Cited

U.S. PATENT DOCUMENTS

| | | | |
|---|---|---|---|
| 4,324,019 A | 4/1982 | Mohnach et al. | 15/250.32 |
| 4,649,591 A | 3/1987 | Guerard | 15/250.32 |
| 5,084,933 A | 2/1992 | Buechele | 15/250.32 |
| 5,435,041 A | 7/1995 | Ho | 15/250.32 |
| 5,611,103 A * | 3/1997 | Lee | 15/250.32 |
| 5,632,059 A * | 5/1997 | Lee | 15/250.32 |
| 5,937,474 A * | 8/1999 | Hussaini | 15/250.32 |
| 6,161,249 A * | 12/2000 | Hussaini | 15/250.32 |
| 6,332,236 B1 * | 12/2001 | Ku | 15/250.32 |

FOREIGN PATENT DOCUMENTS

GB 2034580 * 6/1980 ............. 15/250.32

* cited by examiner

*Primary Examiner*—Gary K. Graham

(57) ABSTRACT

An adapter for windshield wiper arms which is used to couple a wiper arm to a wiper blade is provided. The adapter is capable of accommodating a variety of wiper arm types known as the hook, bayonet and pin type wiper arms, and even the different size hook-and pin type wiper arms. Further, the adapter has vertical wings with protrusions formed at outer surfaces thereof so as to thereby reduce a friction caused between the adapter and the adapter accommodating portion of the wiper blade, and a plurality of embossings formed at inner walls of vertical wings so as to thereby prevent the hook type wiper arm from vibrating.

3 Claims, 6 Drawing Sheets

ADAPTER FOR WINDSHIELD WIPER ARMS

FIELD OF THE INVENTION

The present invention relates to an adapter used to couple a wiper arm to a wiper blade, and more particularly, to an adapter capable of accommodating a variety of wiper arm types known as the hook, bayonet and pin type wiper arms, and even the different size hook-and pin type wiper arms. Further, an adapter of the present invention has vertical wings with protrusions formed at outer surfaces thereof so as to thereby reduce a friction caused between the adapter and the adapter accommodating portion of the wiper blade.

BACKGROUND OF THE INVENTION

Korean Utility Laid Open No. 91-7131 discloses an adapter for vehicle wiper supports, which is described with reference to FIGS. 1 and 2 as follows. An adapter(110) has a bayonet type wiper arm(B) accommodation portion formed by a cover with a coupling hole 114 for insertion of a protrusion 1 formed at the bayonet type arm(B) and an insertion hole 112; a hook type wiper arm(H) accommodation portion formed by a first stopper 126 and a second stopper 128 protruded from an inner upper surface and an inner front surface of a vertical wing 122; and a pin type wiper arm(P) stopper recess 132 formed behind a pivot insertion groove 134 formed at the bottom surface of the adapter.

However, the above-described adapter has disadvantages in terms of production and purchase of products since the adapter is not capable of accommodating different size hook type arms. Further, frictions are caused between the inner wall of an adapter accommodation portion 142 of a wiper blade 140 and the outer wall of the vertical wing of the adapter prevent smooth operation.

SUMMARY OF THE INVENTION

Therefore, it is an object of the present invention to provide an adapter which is capable of accommodating a hook type, a bayonet type, and a pin type wiper arm, respectively. It is another object of the present invention to provide an adapter which is capable of accommodating different size hook type wiper arms. It is still another object of the present invention to provide an adapter with a vertical wing capable of reducing frictions between the adapter and a wiper blade.

When the adapter with such improvements is used, an incorporation of the wiper blade in combination with the arm is obtained through the adapter, and a smooth power transmission is achieved, to thereby improve the wiping performance of the wiper and at the same time lengthen operational lifetime of the wiper.

DETAILED DESCRIPTION OF THE PRESENT INVENTION

Figure 1:
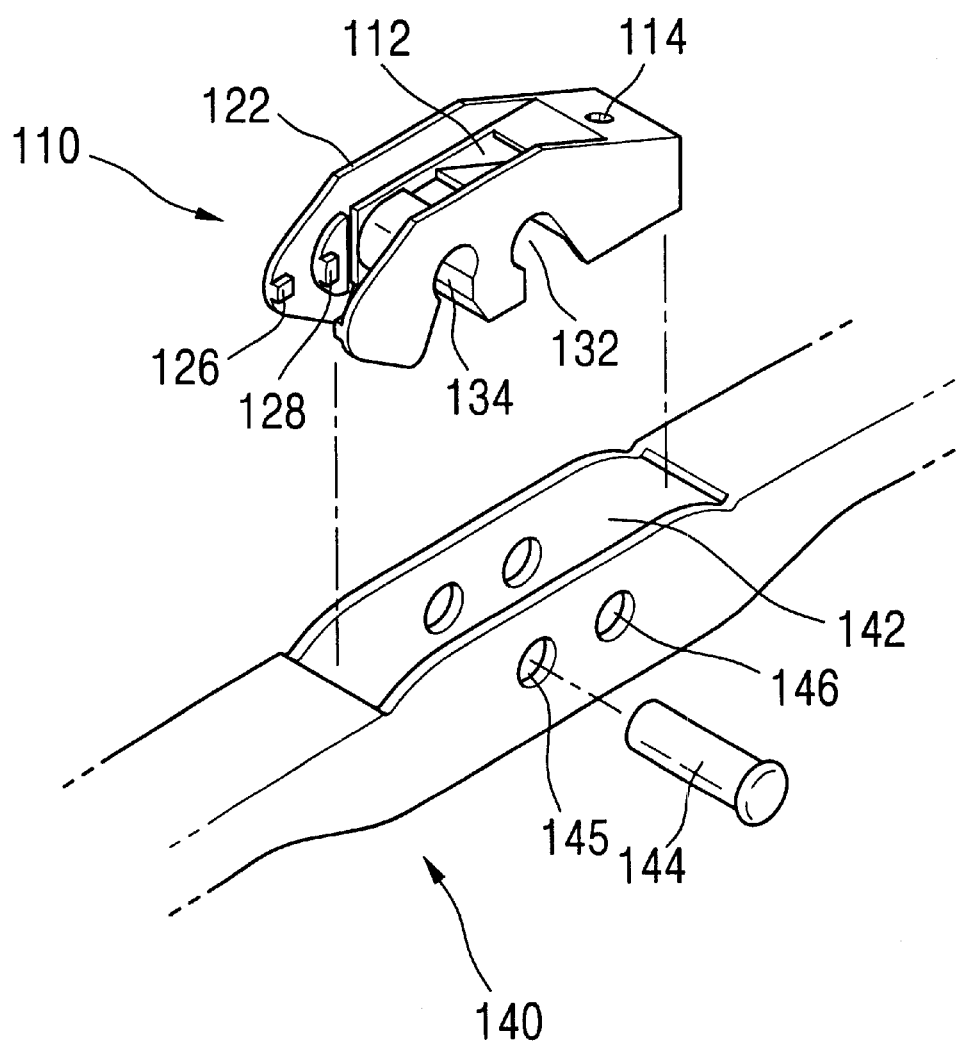
FIG. 1 is a perspective view of a conventional adapter.

Now, the present invention will be explained in more detail with reference to the attached drawings. Throughout the drawings and specifications, identical elements bear identical reference numerals and the description thereof will be omitted.

Referring to FIGS. 3A to 3D, an arm adapter 10 for a wiper blade according to an embodiment of the present invention includes at a bottom surface thereof a pivot insertion groove 34 to be coupled to a wiper blade 40 through a pivot 44, and a pin stopper recess 32 for a pin type wiper arm(P); a hook type wiper arm(H) accommodation portion 21 formed by an inner front surface and an upper surface surrounded by vertical wings 22 with a first stopper 26 and a second stopper 27 protruded, with a predetermined spacing, from the front inner side walls of vertical wings; and a bayonet type wiper arm(B) accommodation portion 11 formed, at a rear inner surface of the arm adapter, by an inclined accommodation opening 12 and a cover 15 having a coupling hole 14 penetrated at the center of the cover. The adapter 10 with the pin stopper recess 32, the hook type wiper arm accommodation portion 21 and the bayonet type wiper arm accommodation portion 11 which are formed integrally with the adapter, is assembled into an adapter insertion opening 42 of the wiper blade 40, and a wiper arm as a power transmission body is coupled to the assembly. The pin stopper recess of the pin type wiper arm(P) has pin accommodation grooves 32a and 32b formed at both sides centering from the pivot insertion groove. The vertical wings 22 have at inner walls thereof a plurality of upper and lower embossings 24a and 24b, and the first stopper 26 has a front inclined surface 27a and a rear stopper 27b formed integrally with each other, and the second stopper 28 is shaped as an inverse wedge, so as to thereby form the hook type wiper arm accommodation portion 21. The vertical wings 22 have at outer surfaces thereof a plurality of C-shaped protrusions 52.

An arm adapter 10 according to another embodiment of the present invention includes a pin type wiper arm having front and rear pin accommodation grooves 32a and 32b with different size so as to thereby accommodate different diameter pins(8).

An arm adapter 10 according to still another embodiment of the present invention includes a hook type wiper arm accommodation portion which is capable of accommodating different size hook type wiper arms H1 and H2 through a first protruded piece 35a and a second protruded piece 36. The first protruded piece 35a is protruded downwardly from a sidewall of the pivot insertion groove 34 and has a triangle groove 35b formed in the front portion of the first protruded piece. The second protruded piece 36 is protruded downwardly from a sidewall of the rear pin stopper groove 32b.

An arm adapter 10 according to further still another embodiment of the present invention includes a pin type wiper arm having different size front and rear pin accommodation grooves 32a and 32b so as to accommodate different size pins 8.

The adapter of the present invention operates as follows.

Figure 2A:
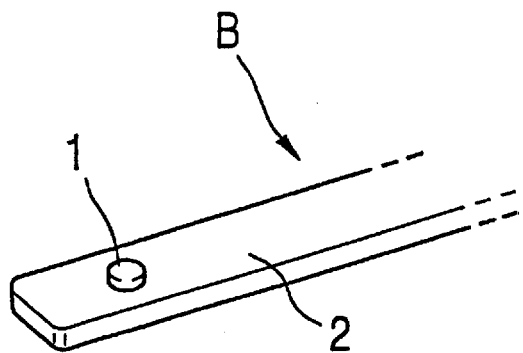
FIGS. 2A, 2B and 2C are perspective views of a bayonet type, a hook type and a pin type wiper arm, respectively.
Figure 2B:
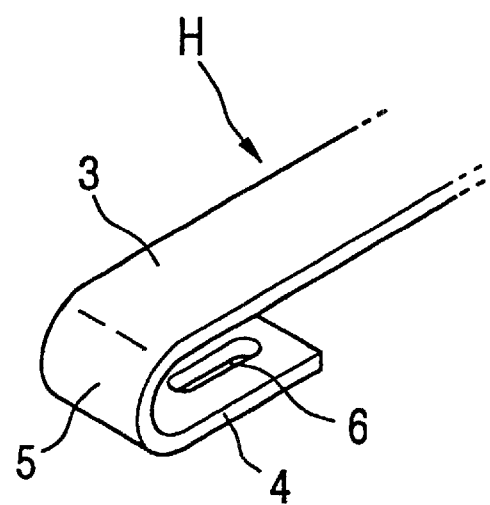
Figure 4A:
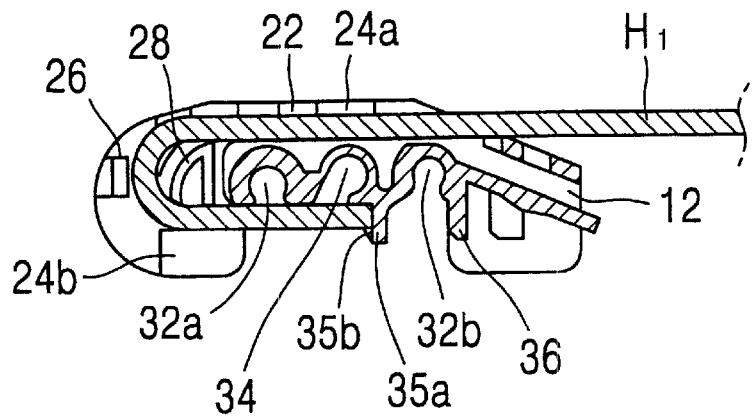
FIGS. 4A and 4B are sectional views illustrating a coupled state between an adapter and hook type wiper arms with different size, according to the present invention.
Figure 6A:
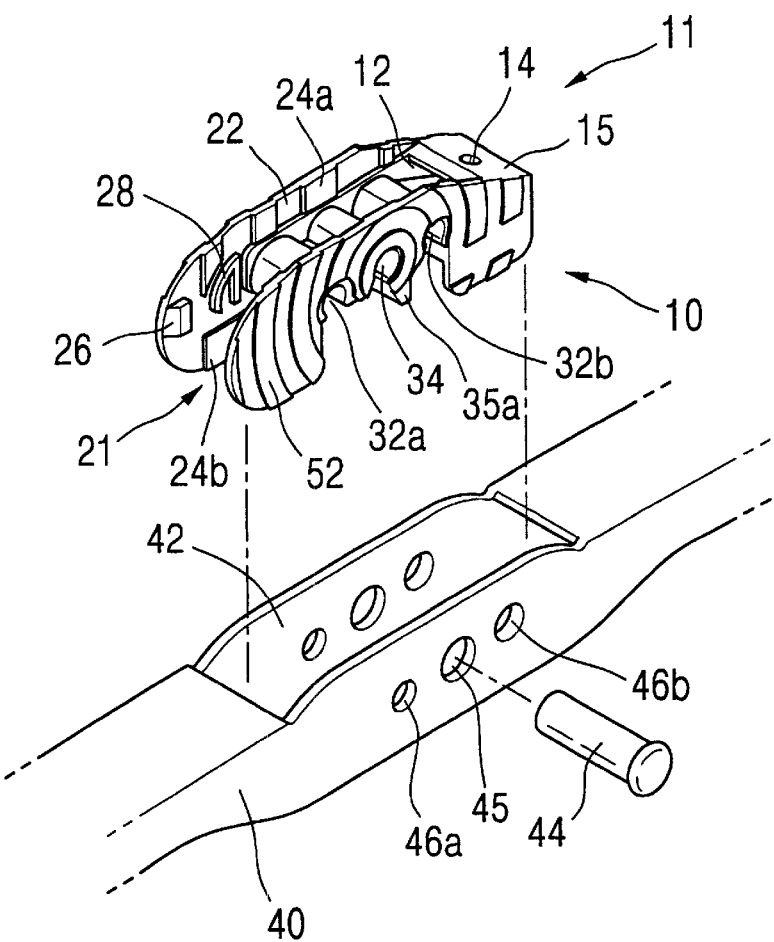
FIGS. 6A and 6B are perspective views illustrating an adapter and a pin type wiper arm when attached/detached to/from each other, according to the present invention.

Referring to FIGS. 2B, 4A and 6A, the case where the hook type wiper arm H1 having a relatively narrower spacing and width between an upper line portion 3 and a lower line portion 4 with a curvature 5 interposed between the upper line portion and the lower line portion is connected to the wiper blade 40, will be explained. In such cases, the hook type wiper arm H1 is inserted into the hook type wiper arm accommodation portion. That is, the curvature 5 of the arm H1 slides through the front inclined surface 27a of the first stopper, toward inside of a stopper 27b when pushed from the front of the adapter. Subsequently, when the upper line portion 3 of the arm H1 is pressed downwardly and thus the upper embossing 24a of the vertical wing is pushed sideways, the front portion of the vertical wing is widened due to the elasticity and the wiper arm H1 contacts the upper surface of the adapter. At this time, an end of the lower line portion 4 of the arm H1 is inserted into the triangle groove 35b of the first protruded piece 35a, the inner side surface of the lower line portion 4 of the arm H1 contacts the lower surface of the inverse wedge-shaped second stopper 28, and the outer side surface of the lower line portion contacts the upper surface of the lower embossing 24b. Subsequently, the arm H1 is accommodated into the adapter insertion opening 42 of the wiper blade 40, and a pivot insertion hole 45 of the blade and the pivot insertion groove 34 are connected through the pivot 44, as shown in FIG. 6A. When the windshield wiper is in operation, the arm H1 may not escape from the space formed among the first stopper 26, the stopper 27b and the second stopper 28. The arm H1 is elastically supported by the upper embossing 24a, and fixed by the lower surface of the second stopper 28 and the upper surface of the lower embossing 24b, a stabilized operation of the wiper without vibration can be obtained. As a consequence, an improved transmission of the power is achieved while lengthening useful life of the product as a whole.

Figure 4B:
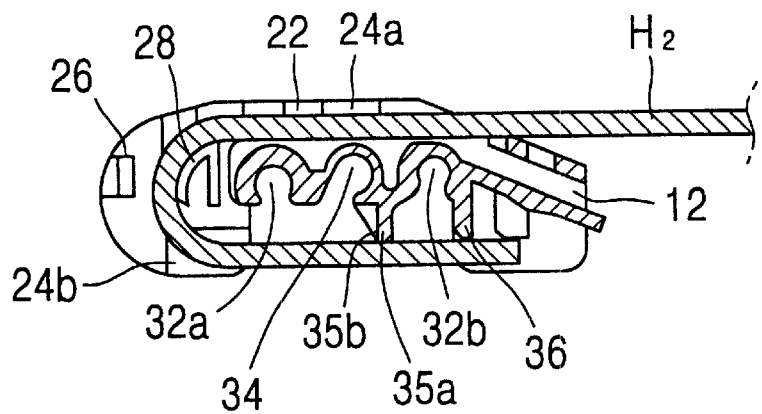

Referring to FIGS. 2B, 4B and 6A, the case where the hook type wiper arm H2 having a relatively larger spacing and width between an upper line portion 3 and a lower line portion 4 with the curvature 5 interposed between the upper line portion and the lower line portion is connected to the wiper blade 40, will be explained. When the arm H2 is pushed backward at the curvature 5, the lower line portion 4 contacts the lower embossing 24b, thereby expanding vertical wings. Then, the arm H2 slides toward inside of the stopper 27b through the inclined surface 27a of the first stopper 26. Subsequently, when the upper line portion 3 of the arm H2 is pressed downwardly, the upper embossing 24a of the vertical wing 22 is pushed and contacts the upper surface of the adapter. At this time, an upper surface of an end of the lower line portion 4 of the arm H2 contacts the first and second protruded pieces 35a and 36, respectively, the slot 6 formed at the arm H2 is coupled to the first protruded pieces 35, and the inner side surface contacts the front arc of the second stopper 28, to thereby achieve a firm fixation of the arm H2. Then, the arm is coupled to the wiper blade in the same manner as for the arm H1 discussed above. While the windshield wiper is in operation, the arm H2 may not escape from the space formed among the first stopper 26, the stopper 27b and the second stopper 28, and is pressedly supported by the upper and lower embossings 24a and 24b, a stabilized operation of the wiper without vibration can be obtained.

Figure 5:
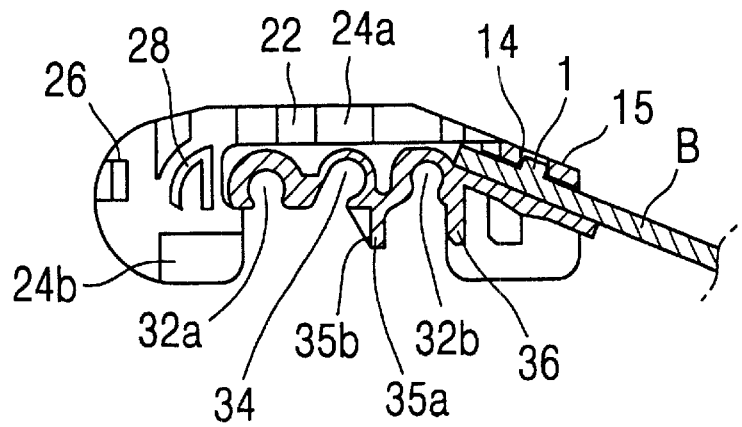
FIG. 5 is a sectional view illustrating a coupled state between an adapter and a bayonet type wiper arm, according to the present invention.

Referring to FIGS. 2A and 5, the case where the bayonet type wiper arm(B) is connected to the wiper 40 will be described. In this case, the wiper arm(B) is inserted to the bayonet type wiper arm(B) accommodation portion 11. That is, when the front portion of the arm(B) is pushed from behind the accommodation opening 12, the coupling hole 14 perforated at the center of the cover 15 of the adapter 10 is coupled to the protrusion 1 of the arm(B), to thereby fix the arm(B). The arm(B) is coupled to the wiper blade in the same manner as for arms H1 and H2 discussed above.

Figure 2C:
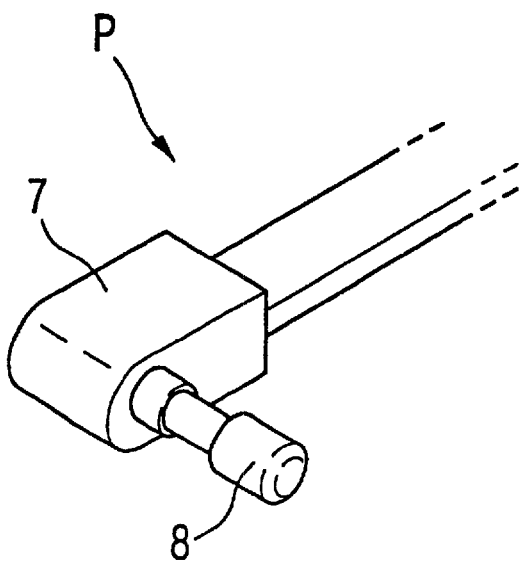
Figure 3A:
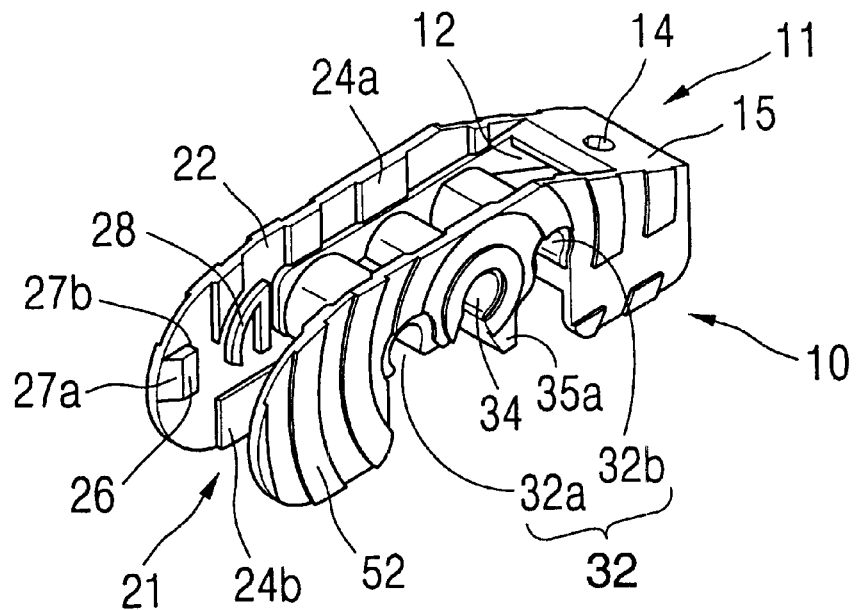
FIGS. 3A, 3B, 3C and 3D are perspective view, sectional view, front view and plane view of an adapter, respectively, according to the present invention.
Figure 3B:
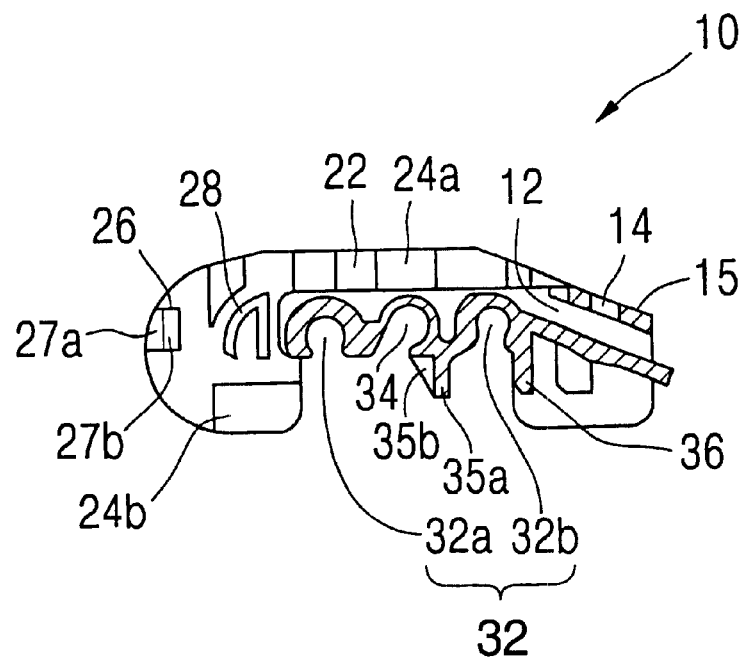
Figure 3C:
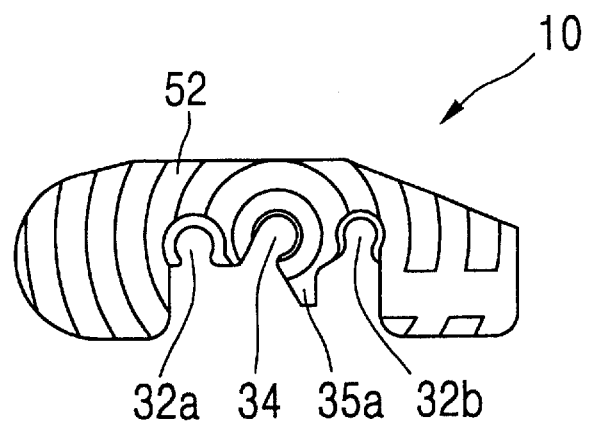
Figure 3D:
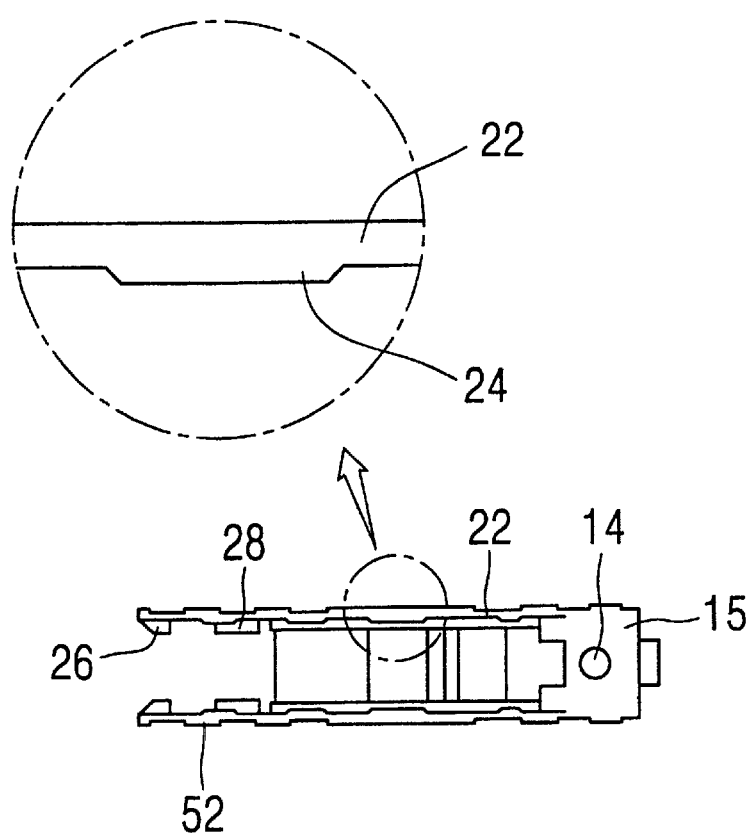
Figure 6B:
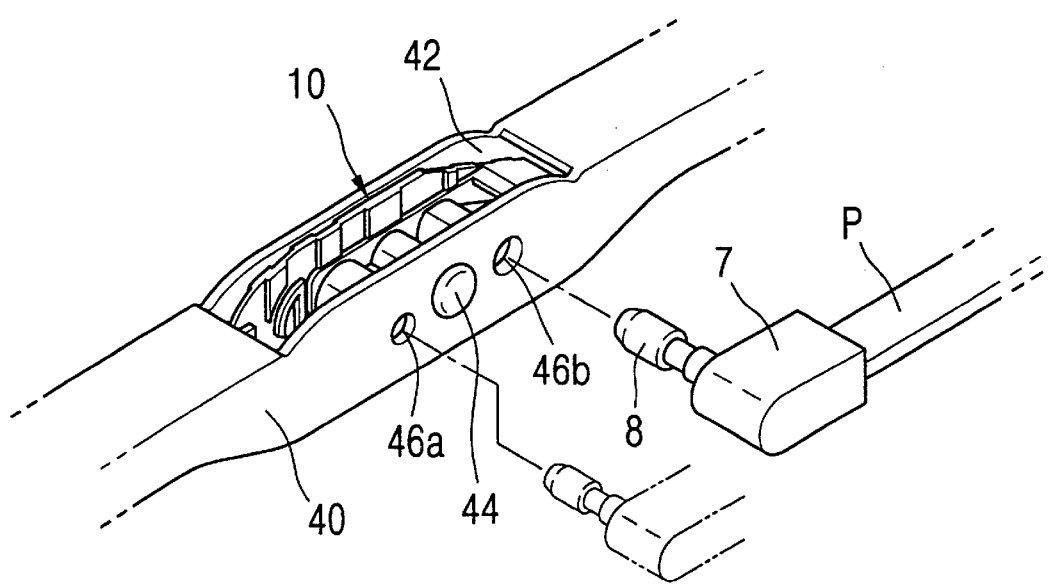

Referring to FIGS. 2C, 6A and 6B, the case where the pin type wiper arm(P) is connected to the wiper 40 will be described. As shown in FIG. 6A, the adapter 10 is accommodated into the adapter insertion opening 42 of the wiper blade 40, and the pivot insertion hole 45 of the blade and the pivot insertion groove 34 of the adapter are connected through the pivot 44. Subsequently, as shown in FIG. 6B, pin insertion holes 46a and 46b of the blade 40 and pin accommodation grooves 32a and 32b of the adapter 10 are locked through a side locking pin(8) of the pin type wiper arm(P). Here, the front pin accommodation groove 32a and the front pin insertion hole 46a can be formed small, while the rear pin accommodation groove 32b and the rear pin insertion hole 46b are formed large, thus allowing different size side locking pins 8 to be coupled to a single adapter.

As described above, an adapter of the present invention is advantageous in that the adapter accommodates all three styles of hook, pin and bayonet, to thereby eliminate the necessity of manufacturing or purchasing adapters for different shape and size arms, and reduce cost and parts count.

Furthermore, when the adapter of the present invention is employed as a means for coupling arms to a wiper blade, arms are accommodated tightly and integrally into each accommodation portion and groove of the adapter so that the transmission of driving force through arms is improved, to thereby also improve performance and operational lifetime of the wiper.

What is claimed is:

1. An adapter for windshield wiper arms comprising:
    a pin type wiper arm accommodation portion formed by a pivot insertion groove to be coupled to a wiper blade through a pivot, and a pin stopper recess for the pin type wiper arm, said pivot insertion groove and said pin stopper recess being formed at a bottom surface of said adapter; a hook type wiper arm accommodation portion formed by an inner front surface and an upper surface surrounded by vertical wings with a first stopper and a second stopper protruding, with a predetermined spacing, from front inner side walls of the vertical wings; and a bayonet type wiper arm accommodation portion formed, at a rear inner surface of said adapter, by an inclined accommodation opening and a cover having a coupling hole penetrating at a center of the cover,
    said adapter being assembled into an adapter insertion opening of said wiper blade, and to a wiper arm as a power transmission body being coupled to an assembly of said adapter and said blade,
    said pin stopper recess for said pin type wiper arm having pin accommodation grooves formed at both sides centering from said pivot insertion groove,
    said vertical wings having at inner walls thereof a plurality of upper and lower embossings, said first stopper having a front inclined surface and a rear stopper formed integrally with each other, and said second stopper having a wedge shape, so as to thereby form a hook type wiper arm accommodation portion, and
    said vertical wings having at outer surfaces thereof a plurality of C-shaped protrusions.

2. An adapter for windshield wiper arms according to claim 1, wherein said pin accommodation grooves of said pin type wiper arm have different sizes so as to accommodate different diameter pins.

3. An adapter for windshield wiper arms according to claim 1 or claim 2, wherein said hook type wiper arm accommodates different size hook type wiper arms through a first protruded piece protruding downwardly from a sidewall of the pivot insertion groove and having a triangle groove formed in a front portion of said first protruded piece, and a second protruded piece protruded protruding downwardly from a sidewall of a rear one of said pin accommodation grooves.

* * * * *